(12) United States Patent
Liu et al.

(10) Patent No.: US 6,246,256 B1
(45) Date of Patent: Jun. 12, 2001

(54) QUANTIZED QUEUE LENGTH ARBITER

(75) Inventors: Yao-Ching Liu, Cupertino; William Dai, San Jose; Jason Chao, Cupertino; Jun Cao, San Leandro, all of CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/450,527

(22) Filed: Nov. 29, 1999

(51) Int. Cl.$^7$ .................................................. G06F 7/38
(52) U.S. Cl. .............................. 326/38; 326/37; 326/46; 710/241
(58) Field of Search .............................. 326/38, 37, 40, 326/46; 710/240, 241, 242, 243, 244

(56) References Cited

U.S. PATENT DOCUMENTS

| 4,511,010 | * | 4/1985 | Sashiki et al. | ........................ 117/25 |
| 5,313,641 | * | 5/1994 | Simcoe et al. | ........................ 395/725 |
| 6,021,455 | * | 2/2000 | Kondo et al. | ........................ 710/241 |

* cited by examiner

Primary Examiner—Michael Tokar
Assistant Examiner—Anh Tran
(74) Attorney, Agent, or Firm—Arent Fox Kintner Plotkin & Kahn PLLC

(57) ABSTRACT

A queue length arbiter system provides for selecting from a plurality of N queues requiring access to a resource. The system includes: an arbitration circuit; and a plurality of weight circuits each being associated with a corresponding one of the queues, and being operative to store a corresponding weight count value, and also being operative to initialize the corresponding weight count value to a corresponding initial weight value determined based on a length value indicative of a number of data portions enqueued at the corresponding queue at an initial time, and being further operative to decrease the corresponding weight count value in response to a corresponding one of a plurality of grant signals, and also being operative to generate a corresponding one of a plurality of weight count signals, the corresponding weight count signal carrying the corresponding weight count value. The arbitration circuit includes: a plurality of weight checking circuits associated with corresponding ones of the queues, each checking circuit being operative to generate a corresponding one of a plurality of select signals indicative of a corresponding selected one of the queues in response to each of the weight count signals, the corresponding selected queue being determined based on the weight count values; and a resolving circuit responsive to each of the select signals, and being operative to choose one of the weight checking circuits, and also being operative to provide the grant signals, the grant signals indicating a granted queue that is selected by the chosen weight circuit.

23 Claims, 6 Drawing Sheets

QUANTIZED QUEUE LENGTH ARBITER

BACKGROUND OF THE INVENTION

1. Field of the Invention

The present invention relates generally to a method and apparatus for resource arbitration in electronic systems. More specifically, the present invention relates to a method and apparatus for resolving requests between a plurality of queues based on a number of data packets currently enqueued at each queue.

2. Description of the Prior Art

In many different types of electronic systems, multiple agents including hardware units and software modules compete for access to a single resource such as an interconnect bus, memory unit, or output buffer. For example, in computer systems, multiple agents may simultaneously request access to a memory device. As another example, in network switches, multiple agents may simultaneously request access to a routing resource such as a packet routing address look up table or a network output port. In such systems, agents generally issue resource requests to gain exclusive access to the resource for a period of time. Such systems require means for arbitrating between the requests in order to determine which agent gains control of the resource when two or more agents are simultaneously competing for control of the resource.

Typically, electronic systems include an arbitration system for arbitrating between requests received from the multiple requesting agents, and for granting access to a selected one of the requesting agents. After one of the requesting agents gains access to the resource, it performs a particular operation and relinquishes access to the resource upon completion of the particular operation or expiration of the predetermined time period, whichever occurs first. However, as the number of competing agents requiring access to a resource increases, the performance of a typical arbitration system decreases, and latencies are incurred.

There are a number common types of arbitration schemes used for implementing arbitration systems. In accordance with one types of arbitration scheme, called "fixed priority arbitration", resource access is granted to a requesting agent having a highest priority. Thus, the highest priority agent is guaranteed to experience very low latency. However, the fixed priority arbitration scheme "starves" requesting agents assigned with a low priority when an agent assigned with the highest priority is frequently requesting access to the resource.

Another type of arbitration scheme, referred to as weighted round robin arbitration, is widely used for managing multiple priority queues. As an example, consider that four queues designated queue_3, queue_2, queue_1, and queue_0 having different priorities are attributed initial weight values of 4, 3, 2, and 1 respectively. In this case, the queues will be considered in the sequence queue_3, queue_2, queue_1, queue_0, queue_3, queue_2, queue_1, queue_3, queue_2, queue_3. Therefore, queue_3 has four tries for access to the resource, queue_2 has three tries, queue_2 has two tries, and queue_1 has a try. In varying prior art weighted round robin arbitration methods, the initial weight values are programmed by software or fixed after power up of the arbiter system.

What is needed is an arbiter system which provides enhanced performance characteristics, and therefore minimal arbitration latency in resolving requests between a plurality of N queues requiring access to a resource.

What is also needed is an arbiter system which provides fast and fair arbitration for resolving requests between a plurality of N queues requiring access to a resource.

Further needed is an arbiter system which provides improved load balancing in resolving requests between a plurality of N queues requiring access to a resource.

SUMMARY OF THE INVENTION

It is an object of the present invention to provide a high performance arbiter system for use in electronic systems, the arbiter circuit providing a high operating frequency, and therefore minimal arbitration latency.

It is another object of the present invention to provide an arbiter system for use in an electronic system including a plurality of queues competing for access to a resource, the arbiter system arbitrating between the queues based on queue lengths associated with the queues.

It is another object of the present invention to provide an arbiter circuit wherein the number of requests which may be resolved by the circuit is easily scaleable without incurring much cost.

Briefly, a presently preferred embodiment of the present invention provides a queue length arbiter system for selecting from a plurality of N queues requiring access to a resource. The arbiter system includes: an arbitration circuit; and a plurality of N weight circuits each being associated with a corresponding one of the queues, and being operative to store a corresponding weight count value, and also being operative to initialize the corresponding weight count value to a corresponding initial weight value determined based on a length value indicative of a number of data portions enqueued at the corresponding queue at an initial time, and being further operative to decrease the corresponding weight count value in response to a corresponding one of a plurality of N grant signals, and also being operative to generate a corresponding one of a plurality of N weight count signals, the corresponding weight count signal carrying the corresponding weight count value.

The arbitration circuit includes: a plurality of N weight checking circuits associated with corresponding ones of the queues, each of the weight checking circuits being operative to generate a corresponding one of a plurality of N select signals indicative of a corresponding selected one of the queues in response to each of the weight count signals, the corresponding selected queue being determined based on each of the weight count values; and a resolving circuit responsive to each of the select signals, and being operative to choose one of the weight checking circuits, and also being operative to provide the grant signals, the grant signals indicating a granted queue that is selected by the chosen weight circuit.

The arbiter system further includes a timing circuit operative to generate a load counter signal in response to the weight count signals, the load counter signal being indicative of the initial time, each of the weight circuits being responsive to the load counter signal. The timing circuit comprises logic for determining the initial time by determining whether each of the weight count values is equal to zero.

The arbiter system further includes: a plurality of N length determining circuits communicatively coupled with corresponding ones of the queues, each of the length determining circuits being operative to generate a corresponding length signal carrying a corresponding one of the length values, each of the weight count circuits being responsive to a corresponding one of the length signals; and a plurality of N weight determining circuits each being operative to generate a corresponding initial weight signal carrying a corresponding one of the initial weight values in response to a corresponding one of the length signals, the corresponding initial weight value being determined based on a corresponding one of the length values.

Each of the weight determining circuits further includes: a comparator circuit for receiving the corresponding length value, the comparator circuit being operative to generate a control signal indicative of whether the corresponding length value is greater than or equal to a maximum weight value; and a multiplexer having a first input for receiving the corresponding length value, a second input for receiving the maximum weight value, an output, and a select input for receiving the control signal, the multiplexer being operative to provide an output signal carrying the maximum weight value if the control signal indicates that the corresponding length value is greater than or equal to the maximum weight value.

Each of the weight checking circuits includes logic operative to determine whether each of the weight count signals is equal zero, and also being operative to select the corresponding queue if the weight count value associated with the corresponding queue is not equal to zero.

An important advantage of the present invention is that the arbiter system provides fast and fair arbitration for resolving requests between a plurality of N queues requiring access to a resource.

Another important advantage of the present invention is that the arbiter system provides improved load balancing in resolving requests between a plurality of N queues requiring access to a resource.

The foregoing and other objects, features, and advantages of the present invention will be apparent from the following detailed description of the preferred embodiment which makes reference to the several figures of the drawing.

IN THE DRAWINGS

DETAILED DESCRIPTION OF THE PREFERRED EMBODIMENTS

The present invention provides an arbitration method and apparatus for arbitrating between a plurality of N queues requiring access to a resource wherein each queue is accorded a priority based on the length of the queue, that is the number of data packets enqueued at the corresponding queue. In accordance with a simplest embodiment of the present invention, the lengths of each of the queues are determined and compared, and the queue having the greatest length is accorded the highest priority in an arbitration scheme. However, the advantages of this method are limited because it is very time consuming to compare the lengths of the queues, and also a large number of gates is required to implement this scheme. In order to solve these problems, the present invention provides an arbitration method including the steps of: determining an initial weight count value associated with each corresponding one of the queues based on the number of data packets enqueued at the corresponding queue at an initial time; arbitrating between the plurality of queues based on priorities associated with the queues, each corresponding one of the queues having a corresponding priority determined based on a current weight count value associated with the queue; and decreasing the weight count value associated with each queue each time the corresponding queue is granted access to the resource. Details of the present invention are explained below.

Figure 1A:
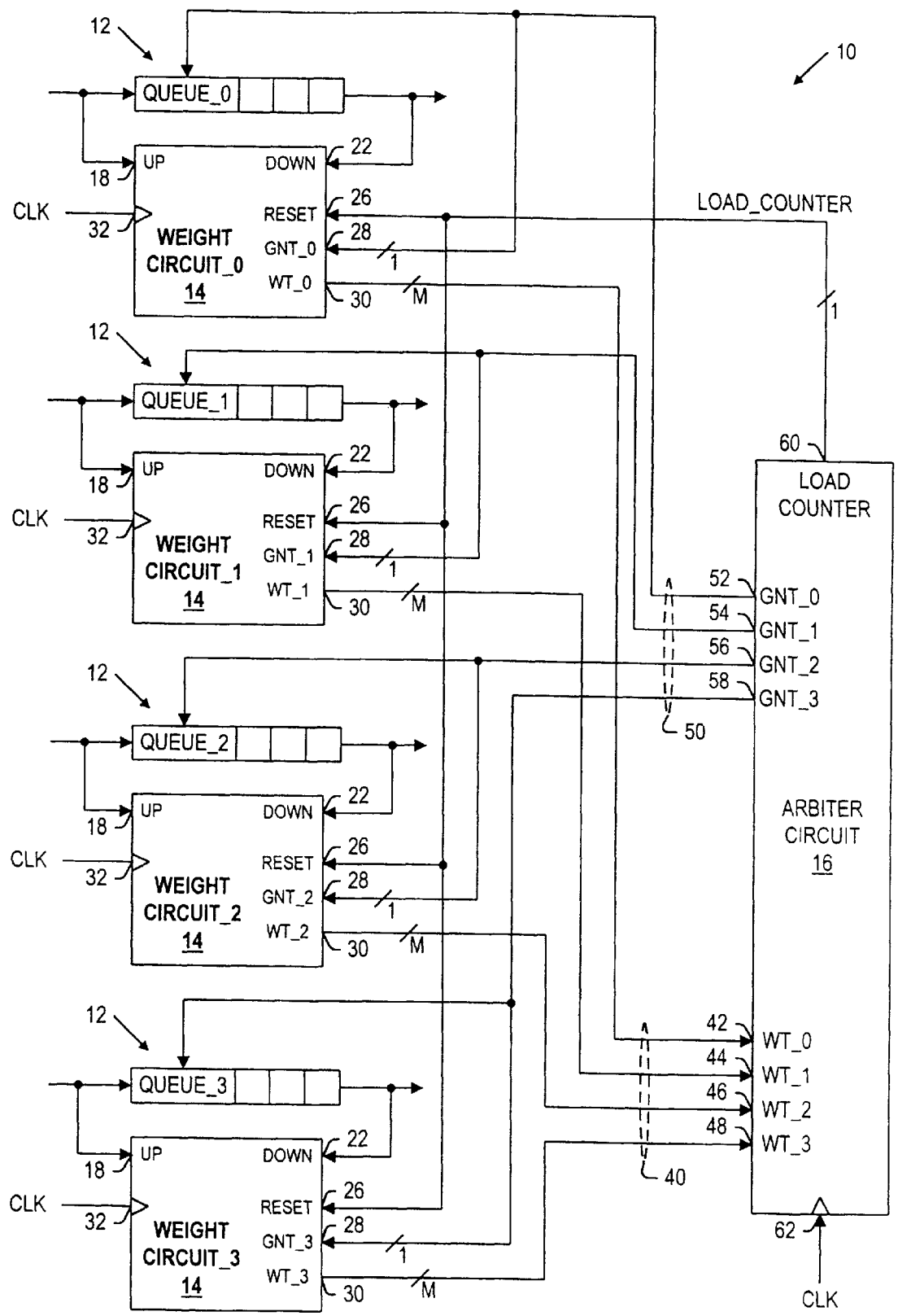
FIG. 1A shows a block diagram illustrating a quantized queue length arbiter system in accordance with the present invention, the arbiter system including a plurality of N queues requiring access to a resource, a plurality of N weight circuits associated with corresponding ones of the queues, and an arbiter circuit.

FIG. 1A shows a block diagram illustrating a quantized queue length arbiter system at 10 in accordance with the present invention. The system 10 includes: a plurality of N=4 queues designated QUEUE_0, QUEUE_1, QUEUE_2, and QUEUE_3; a plurality of N weight circuits 14 associated with corresponding ones of the queues 12, the weight circuits being designated CIRCUIT_0, CIRCUIT_1, CIRCUIT_2, and CIRCUIT_3; and an arbiter circuit 16.

Each of the weight circuits 14 includes: an up count input 18 for receiving a corresponding enqueue signal indicative of a data packet being enqueued at the corresponding one of the queues 12; a down count input 22 for receiving a dequeue signal indicative of a data packet being dequeued from the corresponding one of the queues 12; a reset input 26 for receiving a LOAD_COUNTER signal from the arbiter circuit 16 as further explained below; a grant input 28 for receiving a corresponding one of a plurality of N=4 grant signals designated GNT_0, GNT_1, GNT_2, and GNT_3 from the arbiter circuit 16 as further explained below; and a weight count signal output 30 for providing a corresponding one of a plurality of N weight count signals designated WT_0, WT_1, WT_2, and WT_3, the corresponding weight count signal being indicative of a weight count value stored in the weight circuit as further explained below; and a clock input 32 for receiving a system clock signal designated CLK.

The arbiter circuit 16 includes: a plurality of weight count signal inputs 40 having a first input 42 for receiving the first weight count signal WT_0 from output 30 of CIRCUIT_0, a second input 44 for receiving the second weight count signal WT_1 from output 30 of CIRCUIT_1, a third input 46 for receiving the third weight count signal WT_2 from output 30 of CIRCUIT_2, and a fourth input 48 for receiving a fourth weight count signal WT_3 from output 30 of CIRCUIT_3; a plurality of grant signal outputs 50 having a first output 52 for providing a first grant signal GNT_0 to input 28 of CIRCUIT_0 and also to queuing logic (not shown) associated with QUEUE_0, a second output 54 for providing a second grant signal GNT_1 to input 28 of CIRCUIT_1 and to queuing logic (not shown) associated with QUEUE_1, a third output 56 for providing a third grant signal GNT_2 to input 28 of CIRCUIT_2 and to queuing logic (not shown) associated with QUEUE_2, and a fourth output 58 providing a fourth grant signal GNT_3 to input 28 of CIRCUIT_3 and to queuing logic (not shown) associated with QUEUE_3; a load counter output 60 for providing the LOAD_COUNTER signal to the reset input 26 of each of the weight circuits 14; and a clock signal input 62 for receiving the system clock signal CLK.

Each of the weight circuits 14 is operative to determine a corresponding length value indicative of a number of data packets, or data portions, currently enqueued by the corresponding one of the queues 12, and is also operative to determine a corresponding initial weight value based on the current length value associated with the corresponding queue. Each of the weight circuits 14 provides for storing a corresponding weight count value associated with a corresponding one of the queues 12, and is further operative to initialize the weight count value to the corresponding initial weight value at an initial time in response to the LOAD_COUNTER signal being asserted. Each of the weight circuits 14 is further operative to operative to decrease the corresponding weight count value in response to the corresponding one of the grant signals GNT_0, GNT_1, GNT_2, and GNT_3 being asserted. Each of the weight count signals WT_0, WT_1, WT_2, and WT_3 generated by the weight circuit carries a corresponding weight count value.

In an embodiment, each of the grant signals GNT_0, GNT_1, GNT_2, and GNT_3 carries a corresponding single binary bit grant value which, when asserted, indicates that the corresponding one of the queues 12 receiving the asserted grant signal has been granted access to a resource (not shown). Only one of the grant signals is asserted at a given time. Each of the weight count signals WT_0, WT_1, WT_2, and WT_3 provided by the weight circuits 14 carries an M bit binary weight count value as further explained below. In one embodiment of the present invention, M=3. The LOAD_COUNTER signal carries a single binary bit value which, when asserted, indicates an initial time at which the weight count values are to be initialized as further explained below.

Figure 1B:
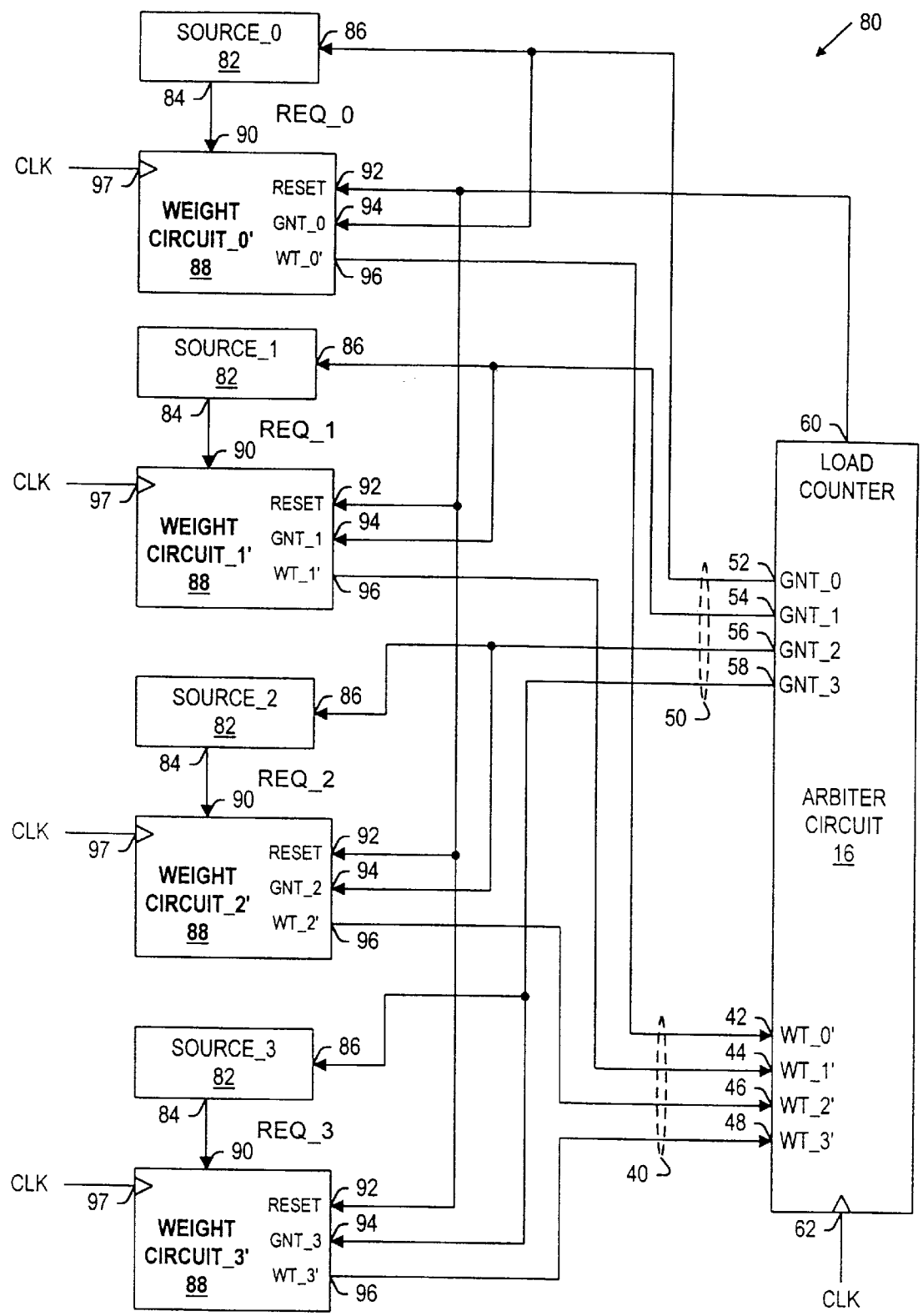
FIG. 1B shows a block diagram illustrating a quantized weight arbiter system in accordance with an alternative embodiment of the present invention, the arbiter system including a plurality of N sources requesting access to a resource, a plurality of N weight circuits associated with corresponding ones of the sources, and an arbiter circuit.

FIG. 1B shows a block diagram illustrating a quantized weight arbiter system at 80 in accordance with an alternative embodiment of the present invention. The system 80 is similar to the quantized queue length arbiter system 10 (FIG. 1A) and includes the arbiter circuit 16, and a plurality of N weight circuits 88 designated CIRCUIT_0', CIRCUIT_1', CIRCUIT_2', and CIRCUIT_3' which are similar to the weight circuits 14 (FIG. 1A) except that the weight circuits 88 do not include up and down count inputs connected to a queue. The system 80 includes: a plurality of N sources 82, the depicted embodiment including N=4 sources 82 designated SOURCE_0, SOURCE_1, SOURCE_2, and SOURCE_3.

Each of the weight circuits 88 includes: a request signal input 90 for receiving a corresponding one of a plurality of N request signals designated REQ_0, REQ_1, REQ_2, and REQ_3 from a corresponding one of the sources 82; a reset input 92 for receiving the LOAD_COUNTER signal from output 60 of the arbiter circuit 16; a grant signal input 94 for receiving a corresponding one of the grant signals GNT_0, GNT_1, GNT_2, and GNT_3 from the grant signal outputs 50 of the arbiter circuit 16; an output 96 for providing a corresponding one of a plurality of N weight count signals designated WT_0', WT_1', WT_2', and WT_3' to the corresponding ones of the weight count signal inputs 40 of the arbiter circuit 16; and a clock input 97 for receiving the system clock signal CLK.

Each of the weight circuits 88 provides for storing a corresponding single binary bit weight count value associated with a corresponding one of the sources 82. Each of the weight circuits 14 is operative to initialize the corresponding weight count value to "1" if the corresponding one of the request signals REQ_0, REQ_1, REQ_2, and REQ_3 is asserted at an initial time in indicated by the LOAD_COUNTER signal being asserted, and is also operative to decrease the corresponding weight count value in response to the corresponding one of the grant signals GNT_0, GNT_1, GNT_2, and GNT_3 being asserted. Each of the weight count signals designated WT_0', WT_1', WT_2', and WT_3' is a single binary bit value indicative of the corresponding one of the weight count values.

Figure 2:
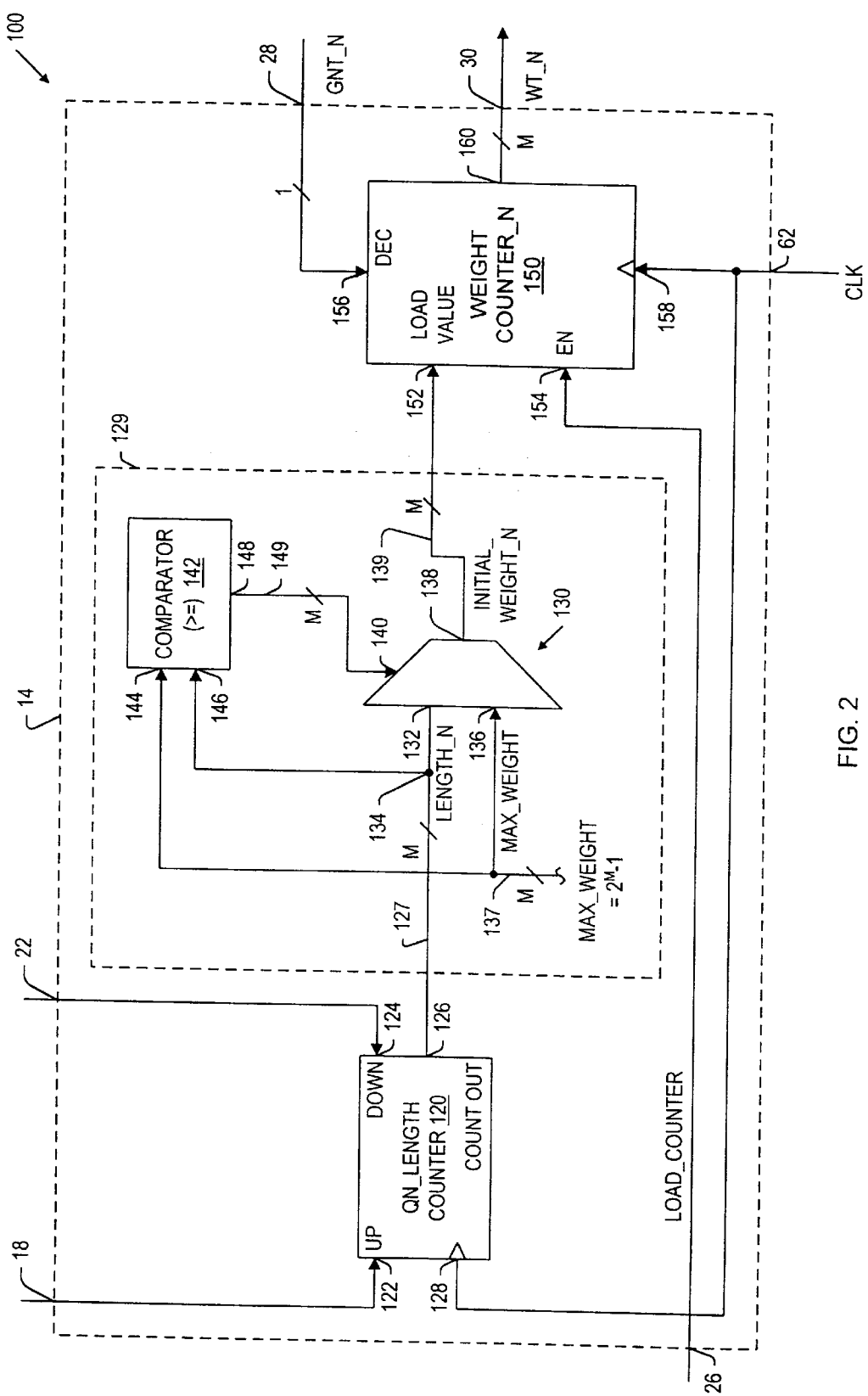
FIG. 2 shows a block diagram illustrating further details of the weight circuits of FIG. 1A.

FIG. 2 shows a block diagram at 100 illustrating further details of each of the weight circuits 14 (FIG. 1A). In the depicted embodiment, each of the weight circuits 14 includes: a length counter circuit 120 for determining a corresponding length value associated with the corresponding queue, the corresponding length value being indicative of a number of data packets currently enqueued at the corresponding queue. In one embodiment, the length counter circuit 120 includes a counter having a length of N=10 bits, and each of the queues may enqueue up to 1024 data packets which may be stored in one of a plurality of N buffers (not shown) associated with the corresponding queue, or in a single buffer (not shown) associated with all of the queues 12 (FIG. 1A). Also, in an embodiment of the present invention, the arbiter system 10 (FIG. 1) is provided in a network switch, and each of the queues is an input queue competing for access to an output queue.

The length counter circuit 120 includes: an up count input 122 for receiving receive the enqueue signal from the queuing logic associated with a corresponding one of the queues via input 18 of the weight circuit 14; a down-count input 124 for receiving the dequeue signal from the queuing logic associated with the corresponding queue via input 22 of the weight circuit; a length output 126 for providing a corresponding one of a plurality of N length signals designated LENGTH_N and carrying a corresponding length value indicative of the number of data packets currently enqueued at the corresponding one of the queues 12 (FIG. 1A); and a clock input 128 for receiving the system clock signal CLK.

Each of the weight circuits 14 also comprises a weight determining circuit 129 including: a multiplexer 130 having a first input 132 for receiving the LENGTH_N signal from output 126 of the length counter circuit 120, a second input 136 for receiving a maximum weight signal designated MAX_WEIGHT from a maximum weight source (not shown) as further explained below, an output 138 for providing a corresponding initial weight signal designated INITIAL_WEIGHT_N indicative of an initial weight value associated with the corresponding queue as further explained below, and a control input 140; and a comparator circuit 142 having a first input 144 for receiving the MAX_WEIGHT signal, a second input 146 for receiving the LENGTH_N signal from output 126 of the length counter circuit 120, and an output 148 for providing a select signal to the control input 140 of multiplexer 130 as further explained below.

Each of the weight circuits 14 further includes a weight counter circuit 150 having: a load value input 152 for receiving the INITIAL_WEIGHT_N signal from output 138 of multiplexer 130; an enable signal 154 for receiving the LOAD_COUNTER signal via input 26 of the weight circuit 14; a decrease input 156 for receiving the corresponding one of the grant signals designated GNT_0, GNT_1, GNT_2, and GNT_3 (FIG. 1A) via input 28 of the weight circuit 14; a clock input 158 for receiving the system clock signal CLK via the clock input 62 of the weight circuit; and a weight count signal output 160 for providing a corresponding one of the weight count signals WT_0, WT_1, WT_2, and WT_3 via output 30 of the weight circuit 14.

Each of the weight count signals WT_0, WT_1, WT_2, and WT_3 carries an M bit weight count value. The length signal designated LENGTH_N provided at output 126 of the length counter circuit 120 carries an M bit length count value, and the MAX_WEIGHT signal provided to input 136 of the multiplexer 130 and to the first input 144 of the comparator 142 carries an M bit maximum weight value which is equal to $2^M-1$. In the described embodiment, which includes N=4 of the queues 12 (FIG. 1A), M=3 and the MAX_WEIGHT signal carries an M=3 bit maximum weight value which is equal to $2^M-1=7$.

Therefore, the weight determining circuit 129 is operative to generate the INITIAL_WEIGHT_N signal carrying an M-bit initial weight value determined based on the M-bit length value received from the length counter circuit via the LENGTH_N signal. The comparator 142 is operative to compare the M-bit length value, received at its first input 144 via the LENGTH_N signal, to the M-bit maximum weight value received at its second input 146 via the MAX_WEIGHT signal. If the length value is greater than or equal to the maximum weight value, that is if the length value is greater than or equal to 7, the control signal provided at output 148 of the comparator 142 carries a binary HI high value causing multiplexer 130 to select the second input 136 thereby providing the maximum weight value at output 138 of the multiplexer. Therefore, the INITIAL_WEIGHT_N signal, provided by the multiplexer 130 to input 152 of the weight counter circuit 150, carries the M-bit length value if the length value is less than the maximum weight value, or carries the maximum weight value if the length value is greater than or equal to the maximum weight value. The functioning of the weight determining circuit 129 may be expressed in accordance with relationship (1), below.

If LENGTH_$N$<MAX_WEIGHT, then INITIAL_WEIGHT_$N$= LENGTH_$N$, Else INITIAL_WEIGHT_$N$=MAX_ WEIGHT  (1)

The weight counter circuit 150 receives the initial weight value at input 152 via the INITIAL_WEIGHT_N signal when the LOAD_COUNTER signal received at its input 154 is asserted. The weight counter circuit 150 includes an M-bit weight count register (not shown) for storing a corresponding weight count value. In the described embodiment, the weight count register is an M=3 bit register. When the LOAD_COUNTER signal is asserted at an initial time, the weight count register is loaded with a corresponding initial weight value received at input 152 via the INITIAL_WEIGHT_N signal. During subsequent cycles of the system clock, the weight count value is decreased by one in response to the corresponding grant signal, received at input 156, being asserted. The weight circuit 150 is operative to generate the corresponding one of the weight count signals WT_0, WT_1, WT_2, and WT_3 which carries the corresponding M-bit weight count value.

Figure 3:
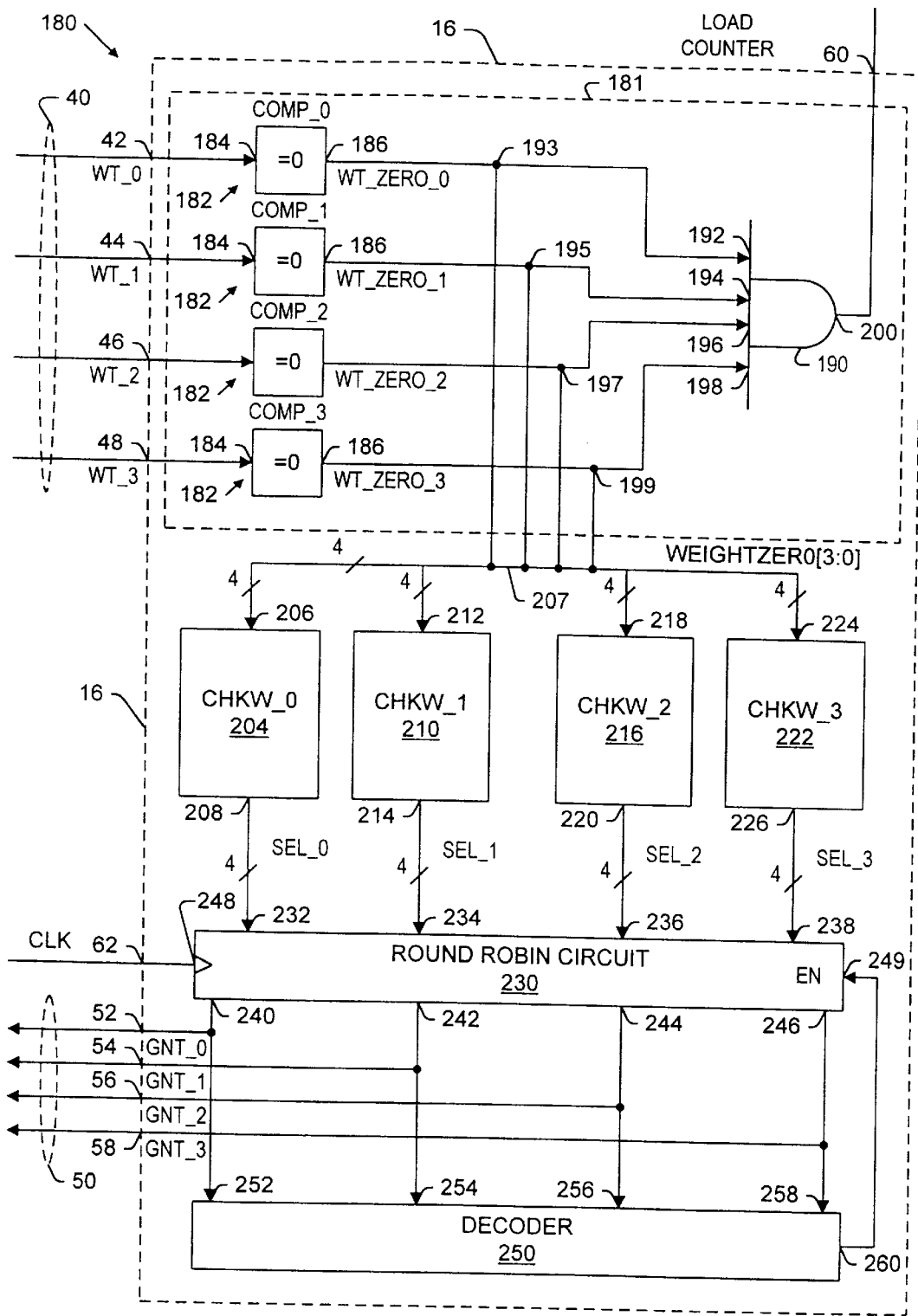
FIG. 3 shows a block diagram illustrating further details of the arbiter circuit including a plurality of N weight checking circuits, and a resolving circuit.

FIG. 3 shows a block diagram at 180 illustrating further details of the arbiter circuit 16 (FIG. 1A). The arbiter circuit 16 comprises a timing circuit 181 including a plurality of N=4 comparator circuits 182 designated COMP_0, COMP_1, COMP_2, and COMP_3 for determining whether corresponding ones of the weight count values, received via the weight count signal signals WT_0, WT_1, WT_2, and WT_3 at the inputs 40 arbiter circuit 16, are equal to zero. Each of the comparator circuits 182 includes: a corresponding input 184 coupled to a corresponding one of the inputs 42, 44, 46, and 48 for receiving the corresponding one of the weight count signals WT_0, WT_1, WT_2, and WT_3; and a corresponding output 186 for providing a corresponding one of a plurality of N weight count signals designated WT_ZERO_0, WT_ZERO_1, WT_ZERO_2, and WT_ZERO_3 and carrying a corresponding one of a plurality of N weight zero values. The comparator circuits 182 may be implemented in accordance with any of a variety of well known digital comparator circuit designs.

Each of the weight zero signals WT_ZERO_0, WT_ZERO_1, WT_ZERO_2, and WT_ZERO_3 indicates whether the corresponding one of the weight count values is equal to zero or not. For example, if the first weight zero value carried by the first weight zero signal WT_0 is determined to be equal to zero, then the first comparator circuit COMP_0 asserts the first weight zero signal WT_ZERO_0 to indicate that the first weight count value is equal to zero. Each of the weight zero signals carries a corresponding one bit weight zero value indicative of whether or not the corresponding one of the weight count values is equal to zero. As mentioned above, each weight count value associated with a corresponding queue is decreased by one each time the grant signal associated with the queue is asserted, that is each time a packet is dequeued from the corresponding one of the queues 12 (FIG. 1A). When one of the weight count values associated with a corresponding queue is equal to zero, then it is assumed that the corresponding queue has been granted access to the resource a number of times equal to the initial weight value calculated for the corresponding queue by the weight determining circuit 129 (FIG. 2) as further explained below.

The arbiter circuit 16 further comprises an AND gate 190 including: a first input 192 for receiving the first weight zero signal WT_ZERO_0 from the output of the first comparator circuit COMP_0 via a node 193; a second input 194 for receiving the second weight zero signal WT_ZERO_1 from the output of the second comparator circuit COMP_1 via a node 195; a third input 196 for receiving the third weight zero signal WT_ZERO_2 from the output of the third zero comparator circuit COMP_2 via a node 197; and a fourth input 198 for receiving the fourth weight count signal WT_ZERO_3 from the output of the fourth comparator circuit COMP_3 via a node 199; and an output 200 for providing the load counter signal designated LOAD_COUNTER via the load counter output 60 of the arbiter circuit 16. The timing circuit 181 asserts the LOAD_COUNTER signal at the "initial time" when each of the weight count values carried by the weight count signals WT_0, WT_1, WT_2, and WT_3 is equal to zero. The function of the depicted timing circuit 181 may be expressed in accordance with relationship (2), below.

LOAD_COUNTER=(WT_0=0) AND (WT_1=0) AND (WT_2= 0) AND (WT_3=0)  (2)

As mentioned above, at the initial time indicated by the LOAD_COUNTER signal, each of the weight counter circuits 150 (FIG. 2) loads the initial weight value carried by the INITIAL_WEIGHT_N signal, and a new weighted arbitration cycle begins.

The arbiter circuit 16 also includes a plurality of N weight checking circuits, each having an input for receiving a WEIGHT_ZERO [3:0] signal from the weight comparator circuits 182 COMP_0, COMP_1, COMP_2, and COMP_3 via an N=4 bit bus 207 that is connected with the weight comparator circuits via nodes 193, 195, 197, and 199, the WEIGHT_ZERO [3:0] signal being derived from the weight zero signals WT_ZERO_0, WT_ZERO_1, WT_ZERO_2, and WT_ZERO_3 and carrying the four weight zero values in parallel. The weight checking circuits include: a first weight checking circuit 204 designated CHKW_0 having an input 206 for receiving the WEIGHT_ZERO [3:0] signal via the bus 207, and an output 208 for providing a first select signal designated SEL_0[3:0] carrying a first 4-bit select value; a second weight checking circuit 210 designated CHKW_1 having an input 212 for receiving the WEIGHT_ZERO [3:0] signal via bus 207, and an output 214 for providing a second select signal designated SEL_1[3:0] carrying a second 4-bit select value; a third weight checking circuit 216 designated CHKW_2 having an input 218 for receiving the WEIGHTZERO [3:0] signal via bus 207, and output 220 for providing a third select signal designated SEL_2[3:0] carrying a third 4-bit select value; and a fourth weight checking circuit 222 designated CHKW_3 having an input 224 for receiving the WEIGHTZERO [3:0] signal via bus 207, and an output 226 for providing a fourth select signal designated SEL_3[3:0] carrying a fourth 4-bit select value. Each bit of the four bit select values carried the select signals SEL_0[3:0], SEL_1[3:0], SEL_2[3:0], and SEL_3[3:0] is associated with corresponding one of the queues 12 (FIG. 1A).

The arbiter circuit 16 also includes a resolving circuit 230 having: N=4 four inputs 232, 234, 236, and 238 for receiving the select signals SEL_0[3:0], SEL_1[3:0], SEL_2[3:0], and SEL_3[3:0] from the outputs 208, 214, 220, and 226 of the weight checking circuits CHKW_0, CHKW_1, CHKW_2, and CHKW_3 respectively; a plurality of N=4 outputs 240, 242, 244, and 246 for providing the N=4 grant signals GNT_0, GNT_1, GNT_2, and GNT_3 to outputs 52, 54, 56, and 58 of the arbiter circuit 16 respectively; a clock input 248 for receiving the system clock signal CLK via the clock input 62 of the arbiter circuit 16; and an enable input 249 for receiving an enable signal as further explained below. In one embodiment, the resolving circuit 230 is a round robin circuit. In other embodiments, the resolving circuit 230 may be implemented as a weight round robin circuit, or any of a variety of well known arbitration circuits.

The arbiter circuit 16 further includes a decoder 250 including: N=4 inputs 252, 254, 256, and 258 for receiving the grant signals GNT_0, GNT_1, GNT_2, and GNT_3 from outputs 240, 242, 244, and 246 of the resolving circuit 230 respectively; and an output 260 for providing the enable signal to the enable input 249 of the resolving circuit 230. The decoder 250 is operative to assert the enable signal if any one of the grant signals GNT_0, GNT_1, GNT_2, and GNT_3 is asserted. In one embodiment, the resolving circuit 230 is operative to choose one of the weight checking circuits CHKW_0, CHKW_1, CHKW_2, and CHKW_3 upon each clock cycle of the system clock signal CLK based on a token passing scheme. The resolving circuit 230 chooses from the weight checking circuits CHKW_0, CHKW_1, CHKW_2, and CHKW_3 by determining which of the weight checking circuits has a token. The token is passed from one weight checking circuit to the next upon a rising edge of the system clock signal if the enable signal, received at input 249, is asserted.

Each of the weight checking circuits 204, 210, 216, and 222 is operative to choose a corresponding one of the queues 12 (FIG. 1A) based on the weight zero values carried by the WEIGHT_ZERO_ [3:0] signal. Each of the select signals SEL_0[3:0], SEL_1[3:0], SEL_2[3:0], and SEL_3[3:0] carries a corresponding four bit value indicating a selected one of the queues 12 (FIG. 1A). Only 1 bit of each of the four bit select values carried by the select signals SEL_0 [3:0], SEL_1[3:0], SEL_2[3:0], and SEL_3[3:0] may be asserted at a given time so that only one of the N queues 12 (FIG. 1A) is selected by a corresponding weight checking circuit. Therefore, as mentioned, each of the select signals SEL_0[3 :0], SEL_1[3:0], SEL_2[3:0], and SEL_3[3:0] carries an N=4 bit select value indicating a corresponding selected queue.

The resolving circuit 230 is operative to choose one of the weight checking circuits, and is also operative to generate the N grant signals GNT_0, GNT_1, GNT_2, and GNT_3 at its outputs 240, 242, 244, and 246 respectively. Each of the one bit grant values carried by the grant signals GNT_0, GNT_1, GNT_2, and GNT_3, is equal to a corresponding bit of the chosen one of the selected signals SEL_0[3:0], SEL_1[3:0], SEL_2[3:0], and SEL_3[3:0] that is chosen by the resolving circuit 230. Therefore, the grant signals GNT_0, GNT_1, GNT_2, and GNT_3 indicate a granted queue that is selected by the chosen one of the weight checking circuits 204, 210, 216, and 222.

In general, the function of each of the N weight checking circuits may be expressed in accordance with Relationship (3), below, wherein "I" represents a weight checking circuit CHKW_I associated with queue "I" of the plurality of N queues 12 (FIG. 1A).

If WT_ZERO_[$I$]=0, then SEL_$I$[$I$]=1

Else if WT_ZERO_[$I$+1]=0, then SEL_$I$[$I$+1]=1

Else if WT_ZERO_[$I$+2]=0, then SEL_$I$[$I$+2]=1

:

:

Else SEL_$I$[$I$+N−1]=1     (3)

Figure 4A:
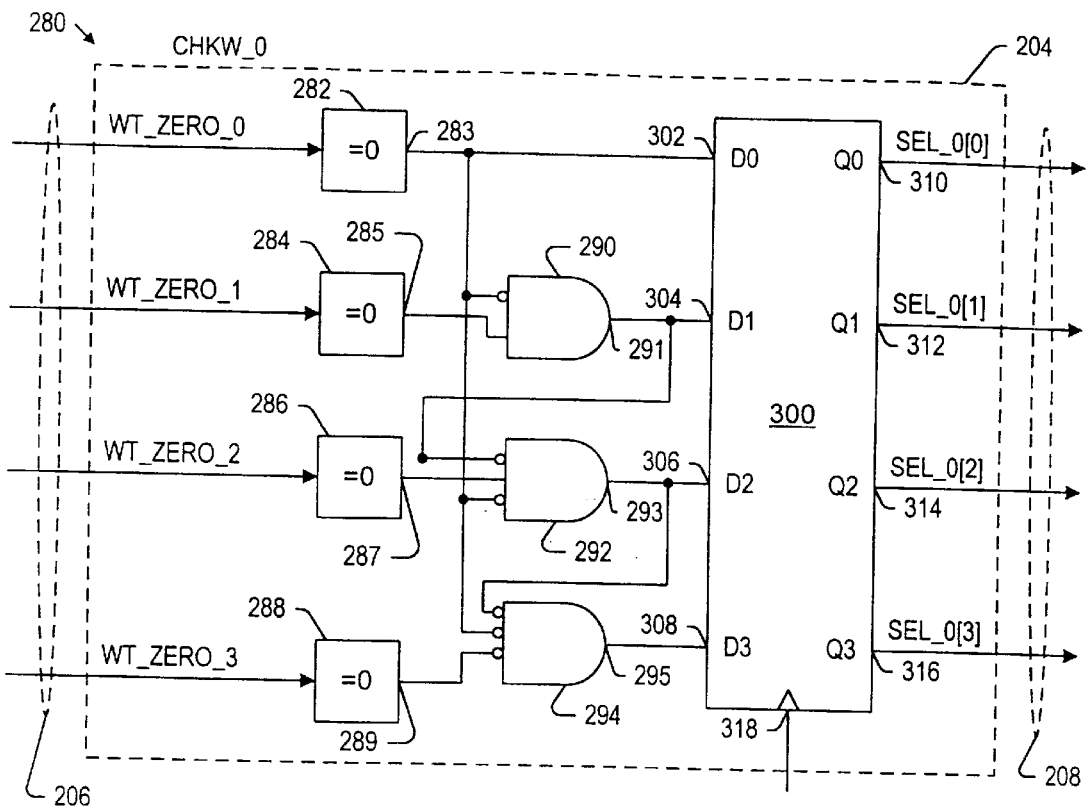
FIGS. 4A through 4D show block diagrams illustrating further details of the weight checking circuits of FIG. 3.

FIG. 4A shows a block diagram illustrating further details of the first weight checking circuit 204 (FIG. 3) at 280. In the depicted embodiment, the weight checking circuit 204 includes: a first zero comparator circuit 282 having an input for receiving the first weight zero signal WT_ZERO_0, and an output 283; a second zero comparator circuit 284 having an input for receiving the second weight zero signal WT_ZERO_1, and an output 285; a third zero comparator circuit 286 having an input for receiving the third weight zero signal WT_ZERO_2, and an output 287; and a fourth zero comparator circuit 288 having an input for receiving the fourth weight zero signal WT_ZERO_3 via input 206 of the circuit 204, and an output 289.

The first weight checking circuit 280 further includes: a first AND gate 290 having a first inverted input communicatively coupled with output 283 of comparator 282, a second input communicatively coupled with output 285 of the comparator 284, and an output 291; a second AND gate 292 having a first inverted input communicatively coupled with output 291 of gate 290, a second input communicatively coupled with output 287 of comparator 286, and a third inverted input communicatively coupled with output 283 of comparator 282, and an output 293; and a third AND gate 294 having a first inverted input communicatively coupled with output 293 of gate 292, a second inverted input communicatively coupled with output 283 of comparator 282, and a third inverted input communicatively coupled with output 289 of comparator 288; a register 300 having a first input 302 communicatively coupled with output 283 of comparator 282, a second input 304 communicatively coupled with output 291 of gate 290, a third input 306 communicatively coupled with output 293 of gate 292, a fourth input 308 communicatively coupled with output 295 of gate 294, and a plurality of N=4 outputs 310, 312, 314, and 316 for providing a plurality of N=4 first select signals designated SEL_0[0], SEL_0[1], SEL_0[2], and SEL_0[3] to output 208 of circuit 204. The function of the first weight checking circuit 204 designated CHKW_0 may be expressed in accordance with Relationship (4), below.

If WT_ZERO_0=0, then SEL_0[0]=1

Else if WT_ZERO_1=0, then SEL_0[1]=1

Else if WT_ZERO_2=0, then SEL_0[2]=1

Else SEL_0[3]=1     (4)

Figure 4B:
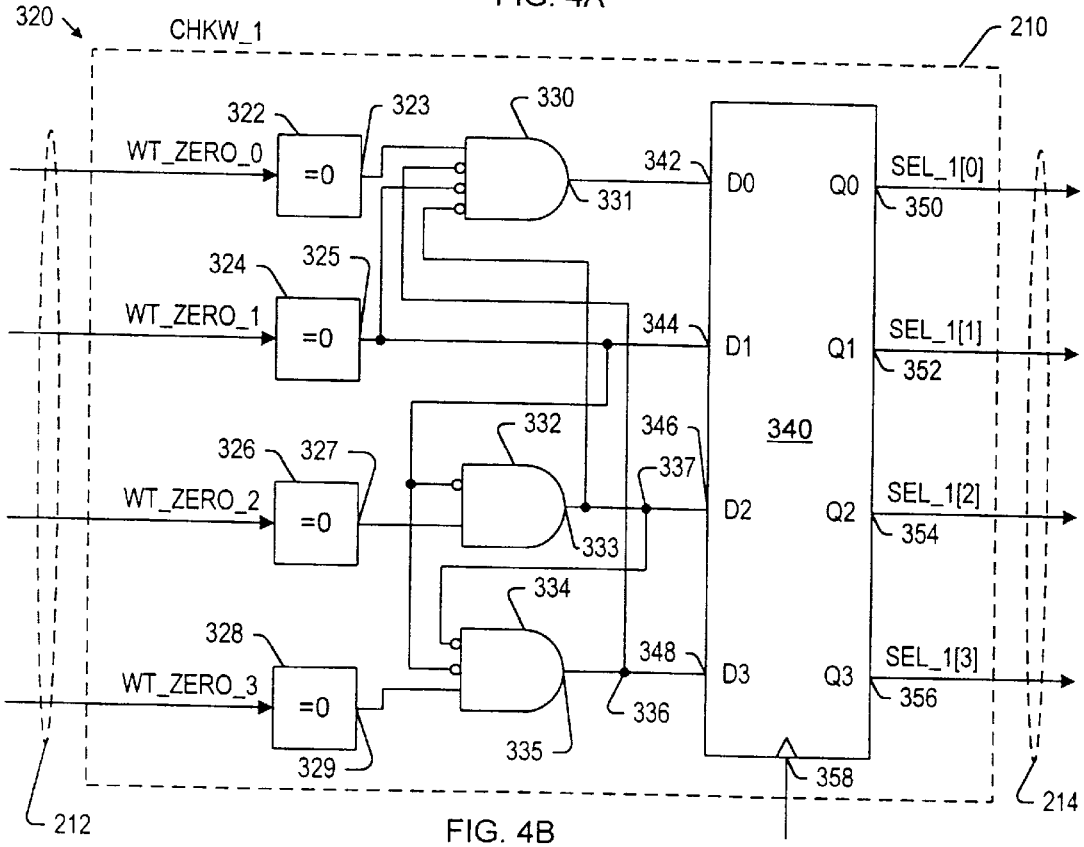

FIG. 4B shows a block diagram illustrating further details of the second weight checking circuit 210 (FIG. 3) at 320. In the depicted embodiment, the second weight checking circuit 210 includes: a first comparator 322 having an input for receiving the first weight zero signal WT_ZERO_0, and an output 323; a second comparator circuit 324 having an input for receiving the second weight zero signal WT_ZERO_1, and an output 325; a third comparator circuit 326 having an input for receiving the third weight zero signal WT_ZERO_2, and an output 327; and a fourth comparator circuit 328 having an input for receiving the fourth weight zero signal WT_ZERO_3, and an output 329.

The weight checking circuit 210 further includes: a first AND gate 330 having a first input communicatively coupled with the output 323 of the first comparator 322, a second inverted input communicatively coupled with a node 336, a third inverted input communicatively coupled with output 325 of comparator 324, and a fourth inverted input communicatively coupled with a node 337; a second AND gate 332 having a first inverted input communicatively coupled with output 325 of comparator 324, a second input communicatively coupled with output 327 of comparator 326, and an output 333 communicatively coupled with the fourth inverted input of the first AND gate 330 via the node 337; a third AND gate 334 having a first inverted input communicatively coupled with output 333 of the second AND gate 332 via node 337, a second inverted input communicatively coupled with output 325 of the second comparator 324, a third input communicatively coupled with output 329 of comparator 328, and an output 335 communicatively coupled with the second inverted input of the first AND gate 330 via the node 336; and a register 340 having a first input 342 communicatively coupled with output 331 of the first AND gate 330, a second input 334 communicatively coupled with the output 325 the second comparator 324, a third input 346 communicatively coupled with output 333 of the second AND gate 332, a fourth input 348 communicatively coupled with output 335 of the third AND gate 334 via the node 336, and a plurality of N=4 outputs 350, 352, 354, and 356 for providing a plurality of N=4 second select signals designated SEL_1[0], SEL_1[1], SEL_1[2], and SEL_1[3] to output 214 of circuit 210. The function of the first weight checking circuit 210 designated CHKW_1 may be expressed in accordance with Relationship (5), below.

If WT_ZERO_1=0, SEL_1[1]=1

Else if WT_ZERO_2=0, SEL_1[2]=1

Else if WT_ZERO_3=0, SEL_1[3]=1

Else SEL_1[0]=1     (5)

Figure 4C:
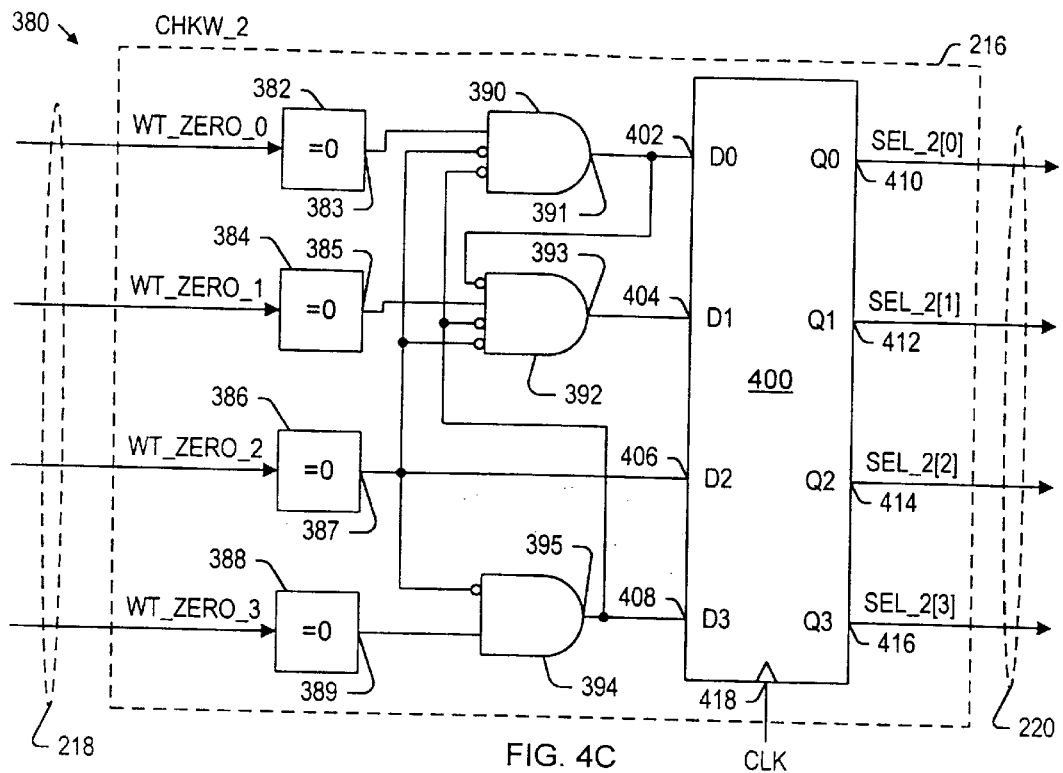

FIG. 4C shows a block diagram illustrating further details of the third weight checking circuit 216 (FIG. 3) at 380. In the depicted embodiment, the weight checking circuit 216 includes: a first zero comparator circuit 382 having an input for receiving the first weight zero signal WT_ZERO_0, and an output 383; a second zero comparator circuit 384 having an input for receiving the second weight zero signal WT_ZERO_1, and an output 385; a third zero comparator circuit 386 having an input for receiving the third weight zero signal WT_ZERO_2, and an output 387; and a fourth zero comparator circuit 388 having an input for receiving the fourth weight zero signal WT_ZERO_3 via input 218 of circuit 216, and an output 389.

The circuit at 380 further includes: a first AND gate 390 having a first input communicatively coupled with output 383 of comparator 382, a second inverted input communicatively coupled with output 387 of comparator 386, and a third inverted input communicatively coupled with an output 395 of a third AND gate 394 as further explained below; a second AND gate 392 having a first inverted input communicatively coupled with output 391 of gate 390, a second input communicatively coupled with output 385 of comparator 384, a third inverted input communicatively coupled with output 395 of gate 394, and a fourth inverted input communicatively coupled with output 387 of comparator 386, and an output 393; and a third AND gate 394 having a first inverted input communicatively coupled with output 387 of comparator 386, a second input communicatively coupled with output 389 of comparator 388, and an output 395. The circuit at 380 further includes a register 400 having: a first input 402 communicatively coupled with output 391 of gate 390; a second input 404 communicatively coupled with output 393 of gate 392; a third input 406 communicatively coupled with output 387 of comparator 386; a fourth input 408 communicatively coupled with output 395 of gate 394; and a plurality of N=4 outputs 410, 412, 414, and 416 for providing a plurality of N=4 third select signals designated SEL_2[0], SEL_2[1], SEL_2[2], and SEL_2[3] to output 220 of circuit 216. Also, the register 400 includes a clock input 418 for receiving the system clock signal CLK.

The function of the third weight checking circuit 216 designated CHKW_2 may be expressed in accordance with Relationship (6), below.

If WT_ZERO[2]=0, SEL_2[2]=1

Else if WT_ZERO[3]=0, SEL_2[3]=1

Else if WT_ZERO[0]=0, SEL_2[0]=1

Else SEL_2[1]=1     (6)

Figure 4D:
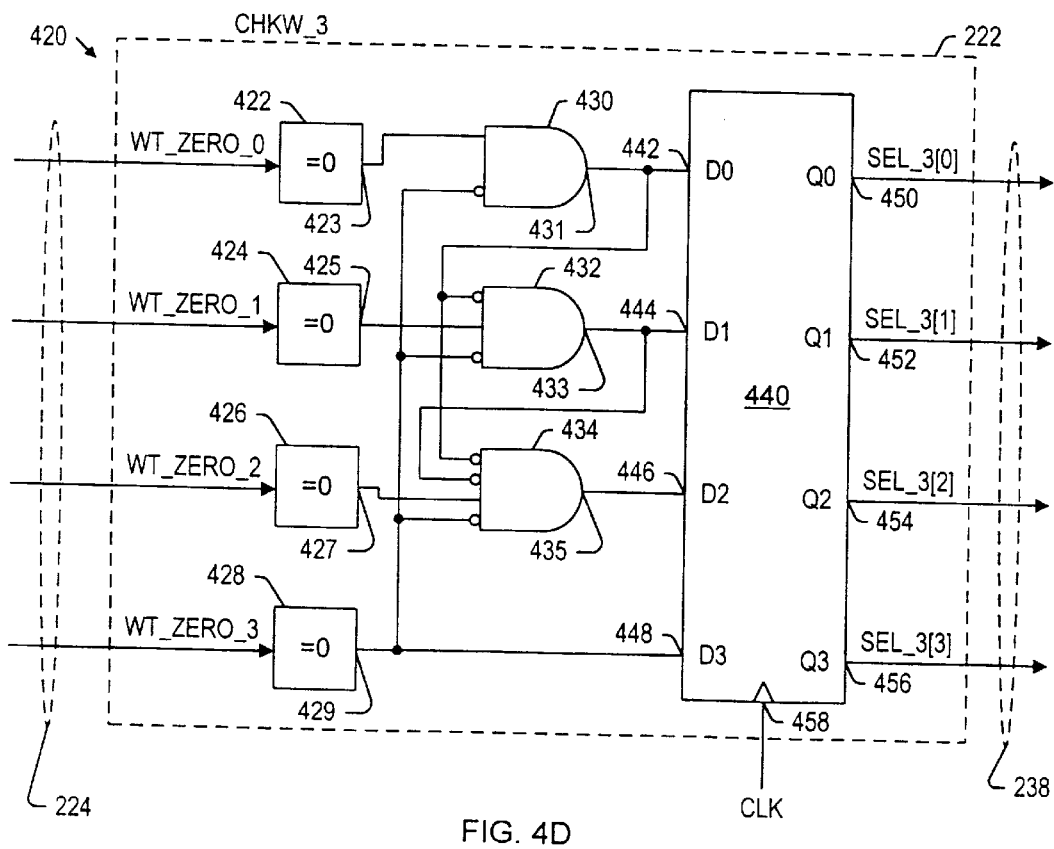

FIG. 4D shows a block diagram illustrating further details of the fourth weight checking circuit 222 (FIG. 3) at 420. In the depicted embodiment, the weight checking circuit 222 includes: a first zero comparator circuit 422 having an input for receiving the first weight zero signal WT_ZERO_0, and an output 423; a second zero comparator circuit 424 having an input for receiving the second weight zero signal WT_ZERO_1, and an output 425; a third zero comparator circuit 426 having an input for receiving the third weight zero signal WT_ZERO_2, and an output 427; and a fourth zero comparator circuit 428 having an input for receiving the fourth weight zero signal WT_ZERO_3, and an output 429. The circuit 222 further includes: a first AND gate 430 having a first input communicatively coupled with output 423 of comparator 422, and a second inverted input communicatively coupled with output 429 of comparator 428, and an output 431; a second AND gate 432 having a first inverted input communicatively coupled with output 431 of gate 430, a second input communicatively coupled with output 425 of comparator 424, a third inverted input communicatively coupled with output 429 of comparator 428, and an output 433; and a third AND gate 434 having a first inverted input communicatively coupled with output 431 of gate 430, a second inverted input communicatively coupled with output 433 of gate 432, a third input communicatively coupled with output 427 of comparator 426, and a fourth inverted input communicatively coupled with output 429 of comparator 428.

The circuit 222 further includes a register 440 having: a first input 442 communicatively coupled with output 431 of gate 430; a second input 444 communicatively coupled with output 433 of gate 432; a third input 446 communicatively coupled with output 435 of gate 434; and a fourth input 448 communicatively coupled with output 429 of comparator 428; and a plurality of N=4 outputs 450, 452, 454, and 456 for providing a plurality of N=4 fourth select signals designated SEL_3[0], SEL_3[1], SEL_3[2], and SEL_3[3] to output 238 of circuit 222.

The function of the fourth weight checking circuit 222 designated CHKW_3 may be expressed in accordance with Relationship (7), below.

If WT_ZERO_3 =0, SEL_3[3]=1

Else if WT_ZERO_0=0, SEL_3[0]=1

Else if WT_ZERO_1=0, SEL_3[1]=1

Else SEL_3[2]=1          (7)

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A queue length arbiter system for selecting from a plurality of N queues requiring access to a resource, the arbiter system comprising:

a plurality of N weight circuits each being associated with a corresponding one of the queues, and being operative to store a corresponding weight count value, and also being operative to initialize said corresponding weight count value to a corresponding initial weight value determined based on a length value indicative of a number of data portions enqueued at the corresponding queue at an initial time, and being further operative to decrease said corresponding weight count value in response to a corresponding one of a plurality of N grant signals, and also being operative to generate a corresponding one of a plurality of N weight count signals, said corresponding weight count signal carrying said corresponding weight count value; and an arbitration circuit including, a plurality of N weight checking circuits associated with corresponding ones of the queues, each of said weight checking circuits being operative to generate a corresponding one of a plurality of N select signals indicative of a corresponding selected one of said queues in response to each of said weight count signals, the corresponding selected queue being determined based on each of said weight count values; and a resolving circuit responsive to each of said select signals, and being operative to choose one of said weight checking circuits, and also being operative to provide said grant signals, said grant signals indicating a granted queue that is selected by the chosen weight circuit.

2. A queue length arbiter system as recited in claim 1 further comprising a timing circuit operative to generate a load counter signal in response to said weight count signals, said load counter signal being indicative of said initial time, wherein each of said weight circuits is responsive to said load counter signal.

3. A queue length arbiter system as recited in claim 2 wherein said timing circuit further comprises logic for determining said initial time by determining whether each of said weight count values is equal to zero.

4. A queue length arbiter system as recited in claim 2 wherein said timing circuit further comprises a plurality of N comparator circuits for receiving corresponding ones of said weight count signals, each of said comparator circuits being operative to determine whether the corresponding weight count value is equal to zero.

5. A queue length arbiter system as recited in claim 1 further comprising a plurality of N length determining circuits communicatively coupled with corresponding ones of the queues, each of said length determining circuits being operative to generate a corresponding length signal carrying a corresponding one of said length values, each of said weight count circuits being responsive to a corresponding one of said length signals.

6. A queue length arbiter system as recited in claim 5 further comprising a plurality of N weight determining circuits each being operative to generate a corresponding initial weight signal carrying a corresponding one of said initial weight values in response to a corresponding one of said length signals, said corresponding initial weight value being determined based on a corresponding one of said length values.

7. A queue length arbiter system as recited in claim 6 wherein each of said weight determining circuits further comprises:

a comparator circuit for receiving the corresponding length value, said comparator circuit being operative to generate a control signal indicative of whether the corresponding length value is greater than or equal to a maximum weight value; and a multiplexer having a first input for receiving said corresponding length value, a second input for receiving said maximum weight value, an output, and a select input for receiving said control signal, said multiplexer being operative to provide an output signal carrying said maximum weight value if said control signal indicates that said corresponding length value is greater than or equal to said maximum weight value.

8. A queue length arbiter system as recited in claim 6 wherein each of said weight determining circuits further comprises:

a comparator circuit for receiving the corresponding length value, said comparator circuit being operative to generate a control signal indicative of whether the corresponding length value is greater than a maximum weight value; and a multiplexer having a first input for receiving said corresponding length value, a second input for receiving said maximum weight value, an output, and a select input for receiving said control signal, said multiplexer being operative to provide an output signal carrying said maximum weight value if said control signal indicates that said corresponding length value is greater than said maximum weight value.

9. A queue length arbiter system as recited in claim 1 wherein each of said weight checking circuits includes logic operative to determine whether each of said weight count signals is equal zero, and also being operative to select said corresponding queue if the weight count value associated with said corresponding queue is not equal to zero.

10. A queue length arbiter system as recited in claim 1 wherein each of said weight checking circuits includes logic operative to determine whether each of said weight count signals is equal zero, and also being operative to select a queue other than said associated queue if the weight count value associated with said corresponding queue is equal to zero.

11. A queue length arbiter system as recited in claim 1 wherein said resolving circuit is a round robin circuit.

12. A queue length arbiter system for selecting from a plurality of N queues requiring access to a resource, the arbiter system comprising:

a plurality of N length determining circuits communicatively coupled with corresponding ones of the queues, each of said length determining circuits being operative to generate a corresponding length signal carrying a corresponding length value indicative of a number of data portions currently enqueued at the corresponding queue;

a plurality of N weight counter circuits each being communicatively coupled with a corresponding one of said length determining circuits, and being operative to store a corresponding weight count value associated with a corresponding one of the queues, and also being operative to initialize said corresponding weight count value to a corresponding initial weight value at an initial time, and being further operative to decrease said corresponding weight count value in response to a corresponding one of a plurality of N grant signals, and being further operative to generate a corresponding one of a plurality of N weight count signals carrying said corresponding weight count value; and an arbitration circuit operative to generate said plurality of N grant signals in response to said plurality of N weight count signals, said grant signals indicating a granted one of the queues.

13. A queue length arbiter system as recited in claim 12 further comprising a timing circuit operative to generate a load counter signal in response to said weight count signals, said load counter signal being indicative of said initial time, each of said weight counter circuits being responsive to said load counter signal.

14. A queue length arbiter system as recited in claim 13 wherein said timing circuit further comprises logic for determining said initial time by determining whether each of said weight count values is equal to zero.

15. A queue length arbiter system as recited in claim 12 wherein each of said length determining circuits comprises a counter circuit that is operative to store a corresponding one of said length values, and is also operative to increase said length value in response to a data portion being enqueued at the corresponding queue, and is further operative to decrease said length value in response to a data portion being dequeued from the corresponding queue.

16. A queue length arbiter system as recited in claim 12 further comprising a plurality of N initial weight determining circuits each being operative to generate a corresponding initial weight signal carrying a corresponding one of said initial weight values in response to a corresponding one of said length signals, said corresponding initial weight value being determined based on a corresponding one of said length values.

17. A queue length arbiter system as recited in claim 16 wherein each of said weight determining circuits further comprises:

a comparator circuit for receiving the corresponding length value, said comparator circuit being operative to generate a control signal indicative of whether the corresponding length value is greater than or equal to a maximum weight value; and a multiplexer having a first input for receiving said corresponding length value, a second input for receiving said maximum weight value, an output, and a select input for receiving said control signal, said multiplexer being operative to provide an output signal carrying said maximum weight value if said control signal indicates that said corresponding length value is greater than or equal to said maximum weight value.

18. A queue length arbiter system as recited in claim 16 wherein each of said weight determining circuits further comprises:

a comparator circuit for receiving the corresponding length value, said comparator circuit being operative to generate a control signal indicative of whether the corresponding length value is greater than a maximum weight value; and a multiplexer having a first input for receiving said corresponding length value, a second input for receiving said maximum weight value, an output, and a select input for receiving said control signal, said multiplexer being operative to provide an output signal carrying said maximum weight value if said control signal indicates that said corresponding length value is greater than said maximum weight value.

19. A queue length arbiter system as recited in claim 12 wherein said arbiter circuit comprises a plurality of N weight checking circuits associated with corresponding ones of said queues, each of said weight checking circuits being communicatively coupled with each of said weight counter circuits for receiving said N weight count signals, each of said weight checking circuits being operative to select one of said queues based on said weight count values.

20. A queue length arbiter system as recited in claim 12 wherein said arbiter circuit comprises:
- a plurality of N weight checking circuits associated with corresponding ones of the queues, each of said weight checking circuits being operative to generate a corresponding one of a plurality of N select signals indicative of a corresponding selected one of said queues in response to each of said weight count signals, said corresponding selected queue being determined based on each of said weight count values; and
- a resolving circuit communicatively coupled with each of said weight checking circuits and being responsive to each of said select signals, and being operative to choose one of said weight checking circuits, and also being operative to provide said grant signals, said grant signals indicating a granted queue that is selected by the chosen weight circuit.

21. A queue length arbiter system as recited in claim 20 wherein each of said weight checking circuits includes logic operative to determine whether each of said weight count signals is equal zero, and also being operative to select said associated queue if the weight count value associated with said corresponding queue is not equal to zero.

22. A queue length arbiter system as recited in claim 20 wherein each of said weight checking circuits includes logic operative to determine whether each of said weight count signals is equal zero, and also being operative to select a queue other than said associated queue if the weight count value associated with said corresponding queue is equal to zero.

23. A queue length arbiter system as recited in claim 12 wherein said resolving circuit is a round robin circuit.

* * * * *